Figure 1:
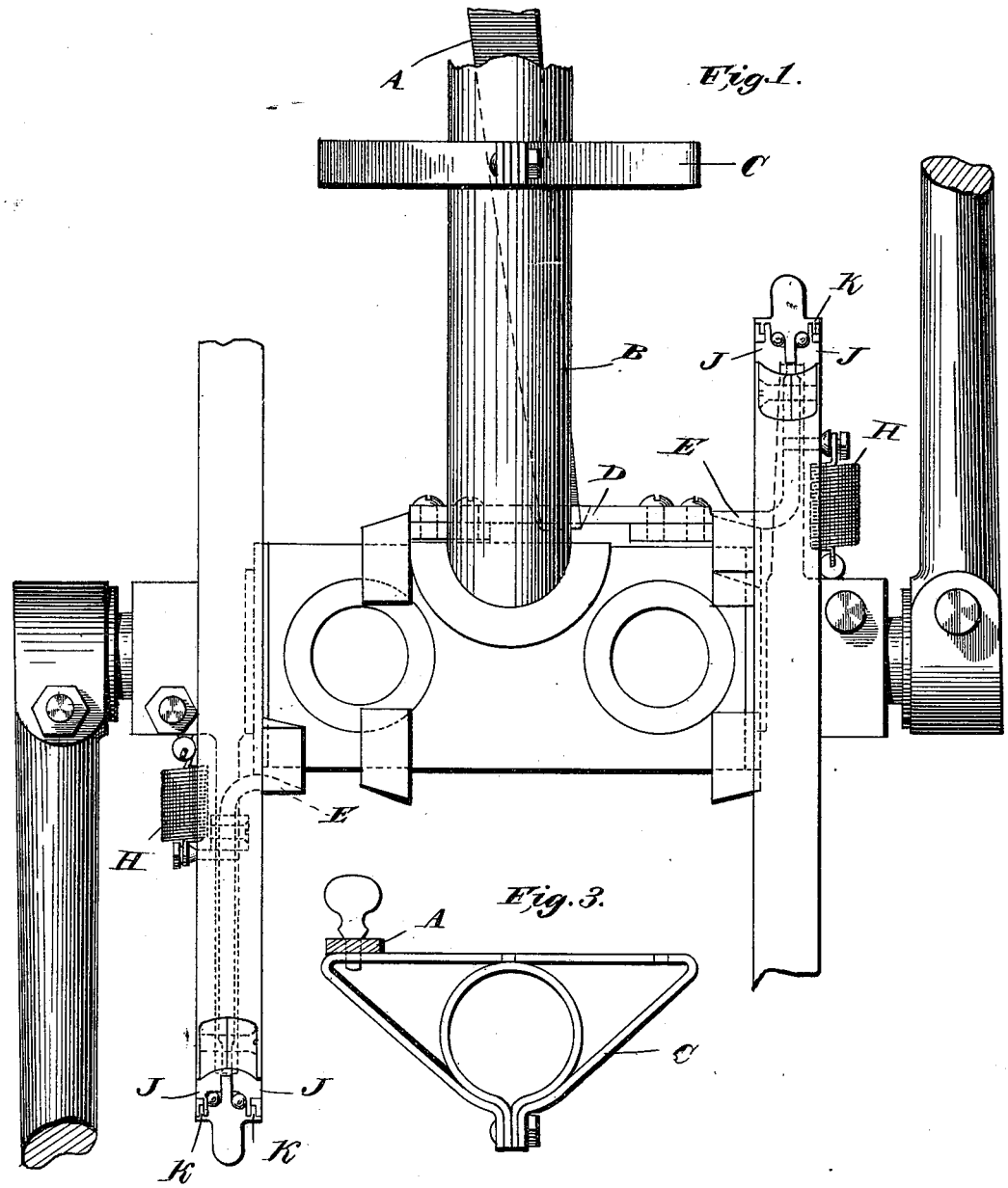

No. 671,945. Patented Apr. 9, 1901.
J. W. CROMER.
CHANGEABLE GEAR FOR SAFETY BICYCLES.
(Application filed July 12, 1899.)
(No Model.) 2 Sheets—Sheet 1.

Witnesses.

Inventor

No. 671,945. Patented Apr. 9, 1901.
J. W. CROMER.
CHANGEABLE GEAR FOR SAFETY BICYCLES.
(Application filed July 12, 1899.)
(No Model.) 2 Sheets—Sheet 2.

Witnesses
E. W. Hart,
Ralph S. Warfield.

Inventor
James W. Cromer,
by John H. Coss.
his Attorney.

THE NORRIS PETERS CO., PHOTO-LITHO., WASHINGTON, D. C.

UNITED STATES PATENT OFFICE.

JAMES W. CROMER, OF SHELBY, OHIO.

CHANGEABLE GEAR FOR SAFETY-BICYCLES.

SPECIFICATION forming part of Letters Patent No. 671,945, dated April 9, 1901.

Application filed July 12, 1899. Serial No. 723,563. (No model.)

*To all whom it may concern:*

Be it known that I, JAMES W. CROMER, a citizen of the United States, residing at Shelby, in the county of Richland and State of Ohio, have invented a new and useful Changeable Gear for Bicycles, of which the following is a specification.

My invention relates to improvements in a changeable driving-gear and shifting device adapted for use on bicycles in which high and low speed gears or sprocket-wheels are fitted on each side of the crank-hanger and on each side of the rear wheel in alinement with each other. The diameter and number of teeth in said gears or sprocket-wheels can be varied, giving more or less speed or power, as required, without interfering with the practical operation of my device.

The objects of my invention are—

First, to provide a simple, practical, and convenient device for changing the speed of a bicycle, giving it a higher or lower rate of speed at the will of the rider when the bicycle is in motion, thereby providing a means to reduce the speed of the bicycle by connecting the driving-wheel with the lower gear or sprocket wheel and obtaining more power (if so desired) or to increase the speed of the bicycle by connecting the driving-wheel with the higher gear or sprocket wheel on the opposite side of the crank-hanger.

My device, as hereinafter described, provides a means whereby the above result is obtained at the will of the rider without dismounting by shifting a lever from the right to the left, and vice versa, thus connecting the high or low gear or sprocket with the crank-hanger and transmitting power or speed to the driving-wheel, according to the side on which the sprocket is engaged. When said lever is on the center of its travel, both gears or sprockets are disengaged, thereby permitting the crank-shaft to remain stationary and obviating the necessity of removing the rider's feet from the pedals when coasting.

Second, to construct a sprocket-wheel having its rim separate from its spokes, with teeth cut in the periphery of its rim, having its face projecting on each side, extending around the circumference of its spokes, and fitted to rotate loosely on ball-bearings formed by two rings attached to the ends of the spokes and the inner surface of the rim of the sprocket, with a flange made integral with said rim extending inwardly, having slots or notches cut in the inner surface of said rim to engage the clutch-pin or pawl.

I attain these objects by means of my peculiar shifting device and the novel construction of the sprocket-wheels.

My shifting device and sprockets are illustrated in the accompanying drawings, in which—

Figure 2:
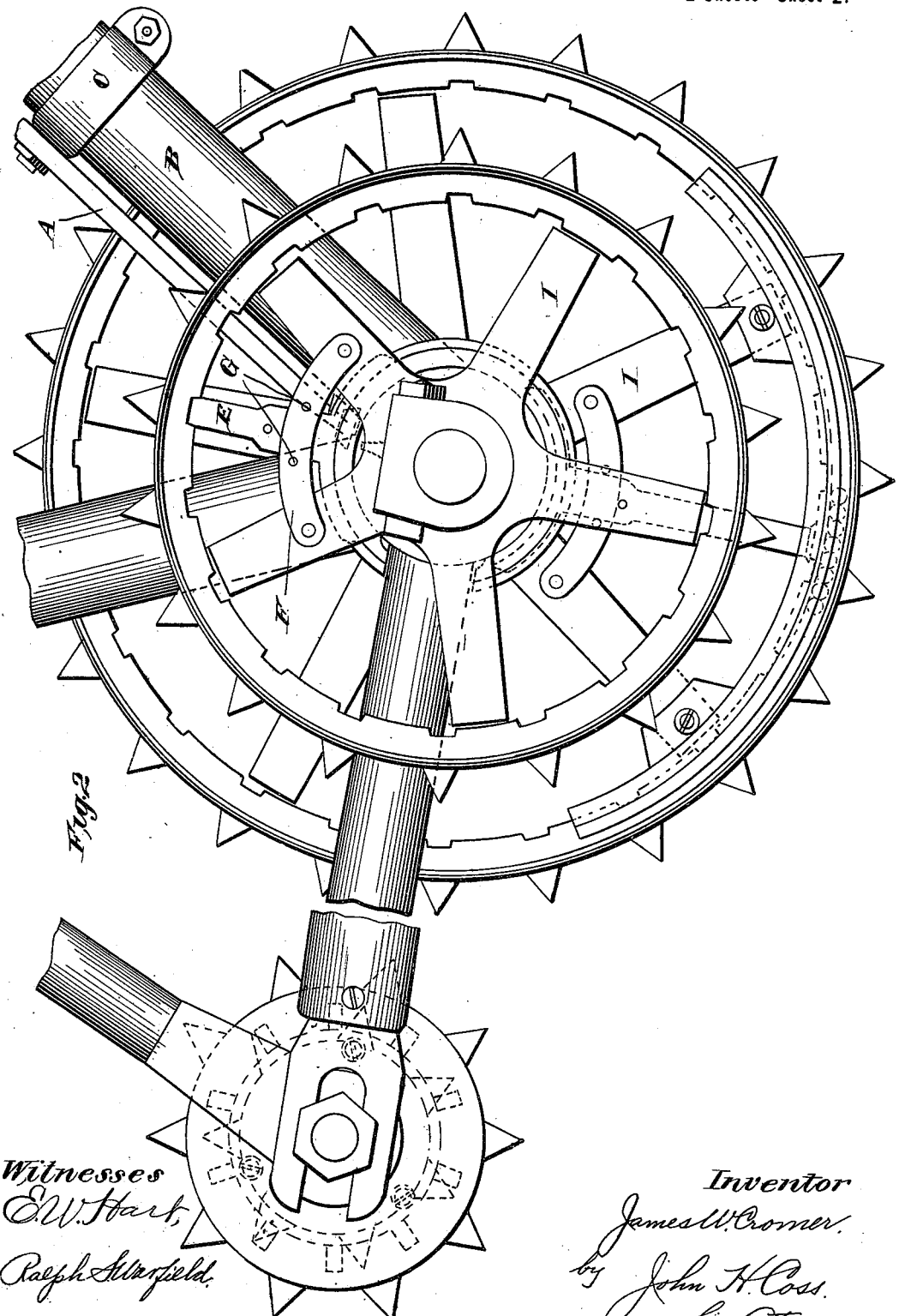

Figure 1 is a rear sectional view of the crank-hanger, showing the operating mechanism of my shifting device attached to an ordinary crank-hanger. Fig. 2 is a side view of the crank-hanger, showing the high and low speed sprocket-wheels with the rim removed and showing their spokes separate from the rim, upon which the teeth of the gears are cut, and the clutch-pin or pawl engaged with the low-speed sprocket. Fig. 3 is a top view of the triangular clamp which is fitted to the frame and shows the doll-pin which is used to lock the shifting lever in position.

Similar letters refer to similar parts throughout the several views.

The lever A is fulcrumed to the tube B and is secured to the tube by means of the clamp C, which is attached to the frame, as shown in the drawings. The upper end of the lever A is held in position by means of the triangular clamp, Fig. 3. The face of said clamp is made flat, having three holes therein, said holes being placed in the surface of the triangular clamp immediately to the right, left, and in the center of said clamp. A hole is placed in the end of the lever A to correspond with the holes in the clamp, Fig. 3, and the lever is held securely in position by inserting the doll-pin.

The lower end of the lever A is inserted in an elongated hole or slot parallel with the sides of the sleeve which is provided for the reception of the end of the lever, the purpose of which is to slide or reciprocate the sleeve D on the crank-hanger, thereby connecting or disconnecting the high or low speed sprocket or permitting both to remain stationary.

The sleeve D is tapered on each side to coincide with the taper on the lower end of the pawl or clutch-pin.

The pawl or clutch-pin E is attached to the spokes of the high and low speed sprocket-wheels by means of a clamp F, which is fitted to the spokes of the sprocket-wheels. In said clamp two pins G are fitted on each side of the pawl or clutch-pin E in alinement when the clutch pin or pawl is being forced to connect with the notches on the inner surface of the flange of the sprocket-rim.

The pawl E on its lower end is constructed to extend in a semicircle around the sleeve D to the center of its diameter, thus permitting the sleeve D to rotate freely under the pawl E.

A coil-spring H is attached to the pawl E by means of a shoulder-bolt which passes through the pawl or clutch-pin E. The lower end of the coil is attached to the crank-collar. This crank-collar consists of an annular ring surrounding the pedal crank-shaft and secured thereto in any suitable manner in order that it may revolve therewith. Thus the sprocket-wheel crank-shaft, spring, and crank-collar revolve together and occupy the same relative positions with respect to each other. The purpose of this spring is to hold the pawl or clutch-pin out of engagement with the sprocket-rim when the opposite sprocket-rim is engaged or when neither sprockets are engaged or connected with the crank-hanger, as in coasting. To the spokes I two rims or rings J J are attached. The inner surfaces of said rims or rings are turned or fitted for ball-bearings, as shown in drawings, letters J J, Fig. 1. A groove K is turned in the periphery of the rims or rings J J, into which a felt washer is placed to act as a dust-protector for the ball-bearings.

By means of the mechanism described above a shifting device for changing the speed of a bicycle is provided that is simple, positive, and practical.

I am aware that the idea of having sprocket-wheels attached to both sides of the hangers and rear driving-wheel having sprocket-wheels fitted therein of high or low speed for the purpose of increasing speed or power is not new. Hence I do not claim this broadly.

What I do claim as my invention, and desire to secure by Letters Patent, is—

1. In a device of the character described applicable to any wheel for changing the speed thereof, the combination with a crank-hanger, crank-shaft and bearings therefor, of a sprocket-wheel, the body portion of which is provided with an annular recess, said body portion fast on the crank-shaft, raceways on said body portion, said raceways on either side of a slot communicating with said annular recess, balls in said raceways, a loose rim provided with sprocket-teeth bearing on said balls, a tongue on said rim extending into said slot, notches on said tongue, retaining-rings between said loose rim and the body portion of the sprocket-wheel whereby to coöperate in conjunction with the tongue to keep the loose rim in place, an L-shaped clutch-pin extending into said annular chamber, one end of said clutch-pin adapted to engage the notches on said tongue whereby to cause the loose rim to revolve with the body portion of the sprocket-wheel, the other end of said clutch-pin bent at right angles to its main portion, said free end beveled and adapted to be engaged by a sliding collar provided with a similar beveled face whereby to throw said clutch-pin into engagement with said notches on the tongue of the loose rim.

2. The combination with crank-hanger, shaft and bearings, of a sprocket-wheel consisting of an outer toothed rim, a notched tongue integral with said rim, raceways on the tongue, and a body portion having an interior annular recess provided with a radial slot, raceways on each side of said slot, balls in said raceways, said tongue received in said slot whereby the outer toothed rim is free to revolve independently of said body portion, retaining and packing rings on said body portion, a clutch-pin operating in said annular recess, its exterior end beveled and turned at right angles with the main portion of the pin, said beveled portion adapted to be engaged by a sliding collar whereby to force the interior end of said pin into engagement with the notches on the tongue, a spring connected to the clutch-pin by means of a stud, a crank-collar secured to the crank-shaft, the opposite end of the spring secured to the crank-collar whereby to automatically and normally hold said pin out of engagement with the notches, a segment located on the body portion of said sprocket and guides on said segment through which guides the clutch-pin reciprocates, substantially as described.

JAMES W. CROMER.

Witnesses:
ELZA H. SMITH,
S. F. STAMBAUGH.